United States Patent
Evans et al.

[11] Patent Number: 5,958,118
[45] Date of Patent: Sep. 28, 1999

[54] AQUEOUS INKS CONTAINING DYE BLENDS

[75] Inventors: Mary Anne Evans, Pittsford; Kathy-Jo Brodsky, Palmyra; Anne L. Wickett, Ontario, all of N.Y.

[73] Assignee: Xerox Corporation, Stamford, Conn.

[21] Appl. No.: 09/106,381

[22] Filed: Jun. 29, 1998

[51] Int. Cl.⁶ .................................................. C09D 11/02
[52] U.S. Cl. ..................... 106/31.27; 106/31.47; 106/31.5
[58] Field of Search ................... 106/31.27, 31.5, 106/31.47

[56] References Cited

U.S. PATENT DOCUMENTS

| | | | |
|---|---|---|---|
| 5,560,766 | 10/1996 | Gundlach | 106/22 R |
| 5,605,566 | 2/1997 | Yui et al. | 106/31.58 |
| 5,734,403 | 3/1998 | Suga et al. | 347/101 |
| 5,851,274 | 12/1998 | Lin et al. | 106/31.43 |
| 5,853,469 | 12/1998 | Colt et al. | 106/31.49 |
| 5,888,285 | 3/1999 | Gundlach et al. | 106/31.47 |

*Primary Examiner*—Helene Klemanski
*Attorney, Agent, or Firm*—Judith L. Byorick

[57] ABSTRACT

Disclosed is an ink composition which comprises water and a colorant selected from the group consisting of (a) a mixture of Acid Yellow 23 dye and Basic Yellow 51 dye, and (b) a mixture of Acid Red 52 dye and Basic Red 15 dye.

9 Claims, No Drawings

5,958,118

AQUEOUS INKS CONTAINING DYE BLENDS

BACKGROUND OF THE INVENTION

The present invention is directed to aqueous ink compositions. More specifically, the present invention is directed to ink compositions suitable for use in thermal ink jet printing processes. One embodiment of the present invention is directed to an ink composition which comprises water and a colorant selected from the group consisting of (a) a mixture of Acid Yellow 23 dye and Basic Yellow 51 dye, and (b) a mixture of Acid Red 52 dye and Basic Red 15 dye.

Ink jet printing systems generally are of two types: continuous stream and drop-on-demand. In continuous stream ink jet systems, ink is emitted in a continuous stream under pressure through at least one orifice or noble. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

U.S. Pat. No. 5,560,766 (Gundlach), the disclosure of which is totally incorporated herein by reference, discloses an ink jet composition which contains an acid dye or reactive dye and a direct dye.

While known compositions and processes are suitable for their intended purposes, a need remains for improved ink compositions. In addition, a need remains for ink compositions which enable improved print quality. Further, a need remains for ink compositions which enable high print quality at reduced dye concentrations. Additionally, a need remains for ink compositions with improved lightfastness. There is also a need for ink compositions with improved optical density. In addition, there is a need for ink compositions which exhibit reduced intercolor bleed when printed adjacent to an ink of another color. Further, there is a need for ink compositions which generate prints with improved color saturation. Additionally, there is a need for ink compositions which, when used in ink jet printers, exhibit reduced dye crusting. A need also remains for ink compositions which, when used in ink jet printers, exhibit reduced kogation. In addition, a need remains for ink compositions which, when used in ink jet printers, exhibit reduced clogging of the jets in the printhead. Further, a need remains for ink compositions which, when used in ink jet printers, exhibit reduced aging-related failures, such as increasing particle count over time. Additionally, a need remains for ink compositions which are easy to manufacture. There is also a need for ink compositions which, when used in ink jet printers, exhibit good latency and recoverability characteristics. In addition, there is a need for ink compositions which enable desirable or improved color gamut.

SUMMARY OF THE INVENTION

It is an object of the present invention to provide improved ink compositions with the above noted advantages.

It is another object of the present invention to provide ink compositions which enable improved print quality.

It is yet another object of the present invention to provide ink compositions which enable high print quality at reduced dye concentrations.

It is still another object of the present invention to provide ink compositions with improved lightfastness.

Another object of the present invention is to provide ink compositions with improved optical density.

Yet another object of the present invention is to provide ink compositions which exhibit reduced intercolor bleed when printed adjacent to an ink of another color.

Still another object of the present invention is to provide ink compositions which generate prints with improved color saturation.

It is another object of the present invention to provide ink compositions which, when used in ink jet printers, exhibit reduced dye crusting.

It is yet another object of the present invention to provide ink compositions which, when used in ink jet printers, exhibit reduced kogation.

It is still another object of the present invention to provide ink compositions which, when used in ink jet printers, exhibit reduced clogging of the jets in the printhead.

Another object of the present invention is to provide ink compositions which, when used in ink jet printers, exhibit reduced aging-related failures, such as increasing particle count over time.

Yet another object of the present invention is to provide ink compositions which are easy to manufacture.

Still another object of the present invention is to provide ink compositions which, when used in ink jet printers, exhibit good latency and recoverability characteristics.

It is another object of the present invention to provide ink compositions which enable desirable or improved color gamut.

These and other objects of the present invention (or specific embodiments thereof) can be achieved by providing an ink composition which comprises water and a colorant selected from the group consisting of (a) a mixture of Acid Yellow 23 dye and Basic Yellow 51 dye, and (b) a mixture of Acid Red 52 dye and Basic Red 15 dye.

DETAILED DESCRIPTION OF THE INVENTION

The present invention is directed to ink compositions which comprises an aqueous liquid vehicle and a colorant selected from the group consisting of (a) a mixture of Acid Yellow 23 dye and Basic Yellow 51 dye, and (b) a mixture of Acid Red 52 dye and Basic Red 15 dye. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The inks of the present invention also include a colorant which is a mixture of two dyes. In one embodiment, the dye is a mixture of Acid Yellow 23 dye and Basic Yellow 51 dye. Acid Yellow 23 dye is commercially available from, for example, Zeneca Colours, Dighton, Massachusetts, as, for example, PROJET YELLOW OAM, from Sandoz as Tartrazine Extra Conc., and from Clariant Corp., Charlotte, N.C., as Duasyn® Acid Yellow XX-SF VP413. Basic Yellow 51 dye is commercially available from, for example, Bayer Corp., Pittsburgh, Pa. as, for example, Special Yellow 5GL-A 200. In this embodiment, the two dyes are present in any desired or effective relative amounts. Typically, the ratio by weight of Acid Yellow 23 dye to Basic Yellow 51 dye is from about 50:50 to about 90:10, preferably from about 70:30 to about 80:20, and more preferably about 75:25, although the relative amounts can be outside of these ranges. In another embodiment, the dye is a mixture of Acid Red 52 dye and Basic Red 15 dye. Acid Red 52 dye is commercially available from, for example, Zeneca Colours, Dighton, Mass., as, for example, PROJET MAGENTA OAM, and from Clariant Corp., Charlotte, N.C., as Duasyn® D Rhodamine B-SF VP353, and is also available from Tricon Colors. Basic Red 15 dye is commercially available from, for example, Crompton & Knowles, Reading, Pa., as, for example, Sevron Brilliant Red B. In this embodiment, the two dyes are present in any desired or effective relative amounts. Typically, the ratio by weight of Acid Red 52 dye to Basic Red 15 dye is from about 60:40 to about 90:10, preferably from about 70:30 to about 80:20, and more preferably about 75:25, although the relative amounts can be outside of these ranges. The dye is present in the ink composition in any effective amount, typically from about 0.5 to about 15 percent by weight, preferably from about 1 to about 10 percent by weight, more preferably from about 2 to about 6 percent by weight, and most preferably from about 3.0 to about 5 percent by weight, although the amount can be outside of these ranges.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

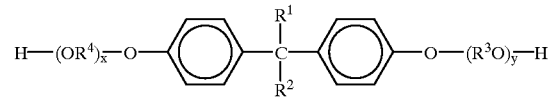

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range.

Ink compositions of the present invention can be of any suitable or desired pH. For some embodiments, such as thermal ink jet printing processes, typical pH values are from about 7.0 to about 9.25, preferably from about 7.2 to about 8.5, and more preferably from about 7.8 to about 8.0, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions were prepared by simple mixing of the following ingredients:

| Ingredient | Supplier | Amount (wt. %) |
|---|---|---|
| tris(hydroxymethyl)aminomethane | American Biorganics | 0.65 |
| EDTA | Dow Chemical | 0.35 |
| polyethylene oxide* | Polysciences | 0.05 |
| DOWICIL 150/200 biocide | Dow Chemical | 0.1 |
| sulfolane** | Phillips | 21 |
| tripropyleneglycol monomethylether (DOWANOL TPM) | Dow Chemical | 18 |
| dye | | as indicated below |
| deionized water | — | remainder (10–75)*** |

*bisphenol-A derivative, molecular weight 18,500, of the formula

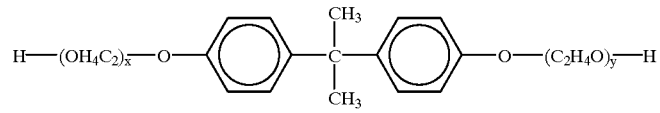

**containing 95 wt. % sulfolane and 5 wt. % water
***the water addition varied widely because the dyes were added as aqueous solutions, and the solution strength varied with lot number and supplier Magenta ink compositions were prepared containing 3.5 percent by weight total dye solids and containing 4.87 percent by weight total dye solids. Within these compositions, the ratio of Basic Red 15 dye to Acid Red 52 dye was varied between 10:90 and 30:70. For comparison purposes, an ink composition containing 3.5 percent by weight dye solids of a colorant consisting solely of Basic Red 15 dye and an ink composition containing 3.5 percent by weight dye solids of a colorant consisting solely of Acid Red 52 dye were also prepared. The viscosity (centipoise, at 25° C.), pH (at 25° C.), surface tension (dynes per centimeter), and conductivity (millimhos) of the inks were measured and are indicated in the table below. The inks thus prepared were hand coated by draw-down techniques onto XEROX® Image Series LX paper (now sold as XEROX® Color Xpressions), and the optical densities of the images thus prepared are reported in the table below.

| dye conc. (wt. %) | ratio BR15:AR52 | viscosity | pH | surface tension | conductivity | optical density |
|---|---|---|---|---|---|---|
| 3.50 | 100% AR52 | 3.45 | 8.53 | 41.2 | 3.61 | 1.06 |
| 3.50 | 10:90 | 3.30 | 7.56 | 33.8 | 3.23 | 1.11 |
| 3.50 | 30:70 | 3.25 | 7.00 | 30.9 | 2.68 | 1.14 |
| 3.50 | 100% BR15 | 3.03 | 6.93 | 30.8 | 1.85 | 1.19 |
| 4.87 | 10:90 | 3.71 | 7.42 | 32.1 | 4.05 | 1.19 |
| 4.87 | 30:70 | 3.58 | 6.86 | 30.8 | 3.33 | 1.20 |

As the results indicate, the prints made with inks containing the blends of dyes exhibited superior optical density compared to the prints made with inks containing only Acid Red 52 dye. Color saturation and hue of the prints was measured by visual inspection. The prints made with the inks containing the blends of dyes exhibited superior color saturation compared to the prints made with inks containing only Acid Red 52 dye, and exhibited more desirable hue compared to the prints made with the inks containing only Basic Red 15 dye. The prints made with the inks containing the blends of dyes exhibited superior lightfastness compared to the prints made with the inks containing only Basic Red 15 dye.

Yellow ink compositions were prepared containing 3.5 percent by weight total dye solids. Within these compositions, the ratio of Basic Yellow 51 dye to Acid Yellow 23 dye was varied between 25:75 and 75:25. For comparison purposes, an ink composition containing 3.5 percent by weight dye solids of a colorant consisting solely of Basic Yellow 51 dye and an ink composition containing 3.5 percent by weight dye solids of a colorant consisting solely of Acid Yellow 23 dye were also prepared. The viscosity (centipoise, at 25° C.), pH (at 25° C.), surface tension (dynes per centimeter), and conductivity (millimhos) of the inks were measured and are indicated in the table below. The inks thus prepared were hand coated by drawdown techniques onto XEROX® Image Series LX paper (now sold as XEROX® Color Xpressions), and the optical densities of the images thus prepared are reported in the table below.

| ratio BY51:AY23 | viscosity | pH | surface tension | conductivity | optical density |
|---|---|---|---|---|---|
| 100% BY51 | 2.91 | 7.48 | 36.9 | 3.31 | 0.852 |
| 75:25 | 3.08 | 7.87 | 40.1 | 3.29 | 0.966 |
| 50:50 | 3.21 | 7.95 | 40.6 | 3.37 | 0.944 |
| 25:75 | 3.29 | 7.87 | 39.9 | 4.74 | 0.958 |
| 100% AY23 | 3.11 | 8.51 | 41.1 | 4.57 | 0.681 |

As the results indicate, the prints made with inks containing the blends of dyes exhibited superior optical density compared both to the prints made with the ink containing only Acid Yellow 23 dye and to the prints made with the ink containing only Basic Yellow 51 dye.

EXAMPLE II

An ink composition was prepared by simple mixing of the following ingredients:

| Ingredient | Supplier | Amount (wt. %) |
|---|---|---|
| imidazole | BASF | 1 |
| EDTA | Dow Chemical | 0.65 |
| polyethylene oxide* | Polysciences | 0.05 |
| DOWICIL 150/200 biocide | Dow Chemical | 0.1 |
| sulfolane** | Phillips | 15 |
| butyl carbitol | Van Waters & Rogers | 12 |
| acetylethanolamine | Scher Chemical | 12 |
| PROJET RED OAM dye | Zeneca Colors | 1.6**** |
| SEVRON BRILLIANT RED B dye | Crompton & Knowles | 1.6**** |
| water | — | 56 |

*bisphenol-A derivative, molecular weight 18,500, of the formula

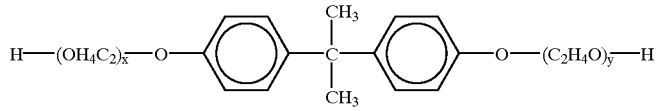

**containing 95 wt. % sulfolane and 5 wt. % water
***the water addition varied widely because the dyes were added as aqueous solutions, and the solution strength varied with lot number and supplier
****amount is dye solids present in the ink Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises water and a colorant selected from the group consisting of (a) a mixture of Acid Yellow 23 dye and Basic Yellow 51 dye, and (b) a mixture of Acid Red 52 dye and Basic Red 15 dye.

2. An ink composition according to claim 1 wherein the colorant is a mixture of Acid Yellow 23 dye and Basic Yellow 51 dye.

3. An ink composition according to claim 2 wherein the colorant contains from about 25 to about 75 percent by weight of Acid Yellow 23 and from about 25 to about 75 percent by weight of Basic Yellow 51.

4. An ink composition according to claim 1 wherein the colorant is a mixture of Acid Red 52 dye and Basic Red 15 dye.

5. An ink composition according to claim 4 wherein the colorant contains from about 70 to about 90 percent by weight of Acid Red 52 and from about 10 to about 30 percent by weight of Basic Red 15.

6. An ink composition according to claim 1 wherein the colorant is present in the ink in an amount of from about 3 to about 6 percent by weight of the ink.

7. An ink composition according to claim 1 wherein the colorant is present in the ink in an amount of from about 3.5 to about 5 percent by weight of the ink.

8. A process which comprises (i) incorporating into an ink jet printing apparatus an ink composition according to claim 1; and (ii) causing droplets of the ink composition to be ejected in an imagewise pattern onto a substrate.

9. A process according to claim 8 wherein the printing apparatus employs a thermal ink jet process wherein the ink in the nobles is selectively heated in an imagewise pattern, thereby causing droplets of the ink to be ejected in imagewise pattern.

* * * * *